United States Patent
Smyth (12) 
(10) Patent No.: US 6,230,128 B1
(45) Date of Patent: May 8, 2001

(54) PATH LINK PASSING SPEECH RECOGNITION WITH VOCABULARY NODE BEING CAPABLE OF SIMULTANEOUSLY PROCESSING PLURAL PATH LINKS

(75) Inventor: Samuel Gavin Smyth, Huntingdon (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 08/530,157

(22) Filed: Nov. 21, 1995

Related U.S. Application Data (63) Continuation-in-part of application No. 08/094,268, filed on Jul. 21, 1993.

(30) Foreign Application Priority Data

Mar. 31, 1993 (EP) .................................. 93302538
Jun. 25, 1993 (EP) .................................. 93304993
Mar. 31, 1994 (WO) ......................... GB94/00704

(51) Int. Cl.[7] .................................. G10L 15/08
(52) U.S. Cl. .......................... 704/236; 704/231
(58) Field of Search ................... 395/2.4, 2.41, 395/2.45, 2.46, 2.47, 2.51, 2.64, 2.65, 2.66

(56) References Cited

U.S. PATENT DOCUMENTS

| | | |
|---|---|---|
| Re. 31,188 | 3/1983 | Pirz et al. . |
| 4,348,553 | 9/1982 | Baker et al. . |
| 4,783,804 | 11/1988 | Juang et al. ............... 395/2.54 |
| 4,803,729 | 2/1989 | Baker ......................... 395/2.5 |
| 4,829,578 | 5/1989 | Roberts . |
| 4,837,831 | 6/1989 | Gillick et al. ............. 395/2.54 |
| 4,888,823 | 12/1989 | Nitta et al. . |
| 4,980,918 | 12/1990 | Bahl et al. . |
| 5,040,127 | 8/1991 | Gerson . |
| 5,228,110 | 7/1993 | Steinbiss . |

(List continued on next page.)

FOREIGN PATENT DOCUMENTS

| | | |
|---|---|---|
| 0 248 377 | 12/1987 | (EP) . |
| 0474496 A3 | 3/1992 | (EP) . |
| 0518742 A1 | 12/1992 | (EP) . |
| 0 535 929 A2 | 4/1993 | (EP) . |

OTHER PUBLICATIONS

Austin et al, "A Unified Direction Mechanism for Automatic Speech Recognition Systems Using Hidden Markov Models", ICASSP, vol. 1, May 23, 1989, Glasgow, pp. 667–670.
"Token Passing:a Simple Conceptual Model For Connected Speech Recognition Systems" S. J. Young et al, Cambridge University Engineering Department, Jul. 31, 1989, pp. 1–23.
ICASSP, vol. 1, May 23, 1989, pp, 667–670, S.C. Austint et al, A unified direction mechanism for automatic speech recognition.
IEEE, Jun. 1991 DM–Dialog An Experimental Speech–to–Speech Dialog Translation System, Hiroaki Kitano, Carnegie Mellon University and NEC Corporation.
Lamel et al, "An Improved Endpoint Detector for Isolated Word Recognition", IEEE Transactions on Acoustics, Speech, and Signal Processing, vol. ASSP 29, No. 4, Aug. 1981, pp. 777–785.
IBM Technical Disclosure Bulletin, vol. 34, No. 9, Feb. 1992, pp. 267–269, "Method of Endpoint Detection".

*Primary Examiner*—Fan Tsang
*Assistant Examiner*—Michael N. Opsasnick
(74) *Attorney, Agent, or Firm*—Nixon & Vanderhye P.C.

(57) ABSTRACT

A path link passing speech recognition system and method recognizes input connected speech. The recognition system has a plurality of vocabulary nodes associated with word representation models, at least one of the vocabulary nodes of the network being able to process more than one path link simultaneously, so allowing for more than one recognition result.

19 Claims, 6 Drawing Sheets

U.S. PATENT DOCUMENTS

| | | |
|---|---|---|
| 5,309,547 | 5/1994 | Niyada et al. . |
| 5,388,183 | 2/1995 | Lynch . |
| 5,390,278 | 2/1995 | Gupta et al. ........................ 395/2.52 |
| 5,524,169 | 6/1996 | Cohen et al. ......................... 395/2.4 |
| 5,583,961 | 12/1996 | Pawlewski et al. .................. 395/2.5 |
| 5,621,859 | 4/1997 | Schwartz et al. ................... 395/2.65 |

Fig.12

PATH LINK PASSING SPEECH RECOGNITION WITH VOCABULARY NODE BEING CAPABLE OF SIMULTANEOUSLY PROCESSING PLURAL PATH LINKS

CROSS-REFERENCE TO RELATED APPLICATION

This application is a continuation-in-part of our copending commonly assigned application Ser. No. 08/094,268 filed Jul. 21, 1993.

BACKGROUND OF THE INVENTION

1. Field of the Invention

The present invention relates to speech processing and in particular to a system for processing alternative parses of connected speech.

2. Related Art

Speech processing includes speaker recognition, in which the identity of a speaker is detected or verified, and speech recognition, wherein a system may be used by anyone without requiring recogniser training, and so-called speaker dependent recognition, in which the users allowed to operate a system are restricted and a training phase is necessary to derive information from each allowed user. It is common in recognition processing to input speech data, typically in digital form, to a so-called front-end processor, which derives from the stream of input speech data a more compact, perceptually significant set of data referred to as a front-end feature set or vector. For example, speech is typically input via a microphone, sampled, digitised, segmented into frames of length 10–20 ms (e.g. sampled at 8 kHz) and, for each frame, a set of coefficients is calculated. In speech recognition, the speaker is normally assumed to be speaking one of a known set of words or phrases. A stored representation of the word or phrase, known as a template or model, comprises a reference feature matrix of that word as previously derived from, in the case of speaker independent recognition, multiple speakers. The input feature vector is matched with the model and a measure of similarity between the two is produced.

Speech recognition (whether human or machine) is susceptible to error and may result in the misrecognition of words. If a word or phrase is incorrectly recognised, the speech recogniser may then offer another attempt at recognition, which may or may not be correct.

Various ways have been suggested for processing speech to select the best or alternative matches between input speech and stored speech templates or models. In isolated word recognition systems, the production of alternative matches is fairly straightforward: each word is a separate 'path' in a transition network representing the words to be recognised and the independent word paths join only at the final point in the network. Ordering all the paths exiting the network in terms of their similarity to the stored templates or the like will give the best and alternative matches.

In most connected recognition systems and some isolated word recognition systems based on connected recognition techniques however, it is not always possible to recombine all the paths at the final point of the network and thus neither the best nor alternative matches are directly obtainable from the information available at the exit point of the network. One solution to the problem of producing a best match is discussed in "Token Passing: a Simple Conceptual Model for Connected Speech Recognition Systems" by S. J. Young, N. H. Russell and J. H. S. Thornton 1989, which relates to passing packets of information, known as tokens, through a transition network. A token contains information relating to the partial path travelled as well as an accumulated score indicative of the degree of similarity between the input and the portion of the network processed thus far.

As described by Young et al, at each input of a frame of speech to a transition network, any tokens that are present at the input of a node are passed into the node and the current frame of speech matched within the word models associated with those nodes. New tokens then appear at the output of the nodes (having "travelled" through the model associated with the node). Only the best scoring token is then passed onto the inputs of the following nodes. When the end of speech has been signalled (by an external device such as a pause detector), a single token will be present at the final node. From this token the entire path through the network can be extracted by tracing back along the path by means of the previous path information contained within the token to provide the best match to the input speech.

The article "A unified direction mechanism for automatic speech recognition using Hidden Markov Models" by S. C. Austin and F. Fallside, ICASSP 1989, Vol. 1, pages 667–670, relates to a connected word speech recogniser which operates in a manner similar to that described by Young et al, as described above. A history relating to the progress of the recognition through the transition network is updated on exiting the word model. At the end of recognition, the result of recognition is derived from the history presented to the output which has the best score. Again only one history is possible for each path terminating at the final node.

Such known arrangements do not allow for an alternative choice to be readily available at the output of the network.

SUMMARY OF THE INVENTION

In accordance with the invention a path link passing speech recognition system for recognising input connected speech comprises means for deriving recognition feature data from an input speech signal, processing means for modelling expected input speech and for comparing the recognition feature data with the modelled expected input speech, the processing means having a plurality of vocabulary nodes associated with word representation models, and means for indicating recognition of the input speech signal in dependence upon the comparison, characterised in that at least one of the vocabulary nodes can process more than one path link simultaneously.

Such an arrangement means that more than one incoming path link can be processed by a node at a given time and hence that more than one recognition result may be obtained.

The modelling means preferably comprises a transition network containing a plurality of noise nodes and vocabulary nodes which are associated with word representation models. The nodes are capable of producing path links comprising fields for storing a pointer to the previous path link, an accumulated score for a path, a pointer to a previous node and a time index for segmentation information. Preferably, the vocabulary nodes capable of processing more than one path link have more than one identical associated word representation model.

The provision that at least one of the vocabulary nodes of the network has more than one associated word representation model allows the speech recogniser to process multiple paths at the same time and so allows more than one path link to be propagated across each inter-node link at each input frame. In effect, the invention creates multiple layers of a transition network along which several alternative paths may be propagated. The best scoring path may be processed by the first model of a node, the next best by the second and so on until either parallel models or incoming paths run out.

In general terms "network" includes directed acyclic graphs (DAGs) and trees. A DAG is a network with no cycles and a tree is a network in which the only meeting of paths occurs conceptually right at the end of the network.

The term "word" here denotes a basic recognition unit, which may be a word but equally well may be a diphone, phoneme, allophone, etc. Recognition is the process of matching an unknown utterance with a predefined transition network, the network having been designed to be compatible with what a user is likely to say.

In order to identify the phrase that has been recognised, the system may include means for tracing the path link back through the network.

Alternatively, the system may also include means for assigning a signature to at least some of the nodes having associated word representation models and means for comparing the signature of each path, to determine the path with the best match to the input speech and that with the second best alternative match.

This arrangement allows for an alternative which is necessarily different in character to the best match and does not differ merely in segmentation or noise matches.

The word representation models may be Hidden Markov Models (HMMs) as described generally in British Telecom Technology Journal, April 1988, Vol, 6, no. 2, page 105: Cox, "Hidden Markov Models for automatic speech recognition: theory and application", templates, Dynamis Time Warping models or any other suitable word representation model. The processing which occurs within a model is irrelevant as far as this invention is concerned.

It is not necessary for all the nodes having associated word models to have a signature assigned to them. Depending on the structure of the transition network, it may be sufficient only to assign signatures to those nodes which appear before a decision point within a network. A decision point as used herein relates to a point in the network which has more than one incoming path.

Partial paths may be examined at certain decision points in the network, certain constraints being imposed at these decision points so that only paths conforming to the constraints are propagated, as described in the applicants' International patent application filed on Mar. b 31st,1994 entitled "Connected Speech Recognition", claiming priority from European applications Nos. 93302539.7 and 93304503.1, corresponding to copending U.S. patent application Ser. No. 08/530,170 filed Oct. 11, 1995 naming Smyth et al as inventors. Each decision point is associated with a set of valid signatures and any path links with signatures that are not in the set are discarded.

The accumulated signature may be used to identify the complete path, resulting in extra efficiency of operation as the path links need not be traversed to determine the path identity, and the partial path information of the token may not be generated at all. In this case the signature field must be large enough to identify all paths uniquely.

For efficient operation of the system according to the invention, the signal processing of path signatures is preferably carried out in a single operation to increase processing speed.

Other aspects and preferred embodiments of the invention are as disclosed and claimed herein, with advantages that will be apparent hereafter.

BRIEF DESCRIPTION OF THE DRAWINGS

The invention will now be described further, by way of example only, with reference to the accompanying drawings in which.

DETAILED DESCRIPTION OF EXEMPLARY EMBODIMENTS

Figure 1:
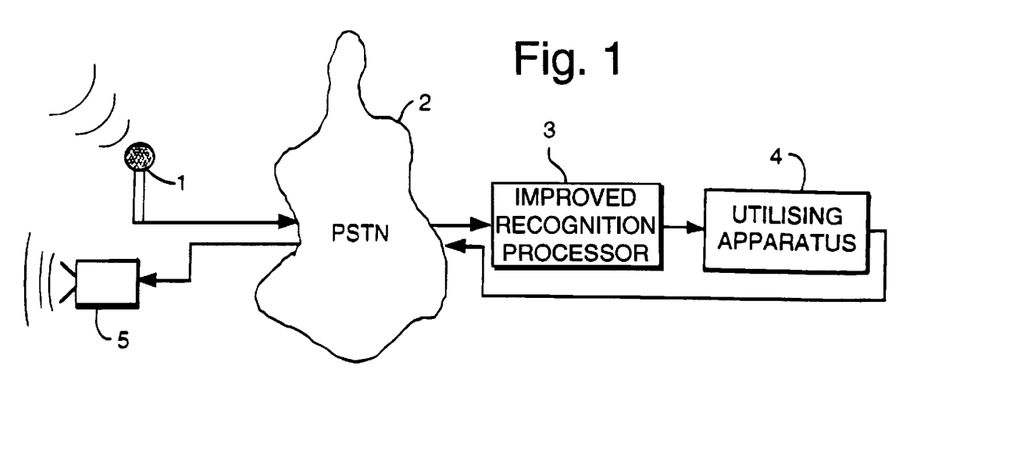
FIG. 1 shows schematically the employment of a recognition processor according to the invention in a telecommunications environment.

Referring to FIG. 1, a telecommunications system including speech recognition generally comprises a microphone 1, typically forming part of a telephone handset, a telecommunications network (typically a public switched telecommunications network (PSTN)) 2, a recognition processor 3, connected to receive a voice signal from the network 2, and a utilising apparatus 4 connected to the recognition processor 3 and arranged to receive therefrom a voice recognition signal, indicating recognition or otherwise of a particular word or phrase, and to take action in response thereto. For example, the utilising apparatus 4 may be a remotely operated banking terminal for effecting banking transactions.

In many cases, the utilising apparatus 4 will generate an auditory response to the speaker, transmitted via the network 2 to a loudspeaker 5 typically forming a part of the subscriber handset.

In operation, a speaker speaks into the microphone 1 and an analog speech signal is transmitted from the microphone 1 into the network 2 to the recognition processor 3, where the speech signal is analysed and a signal indicating identification or otherwise of a particular word or phrase is generated and transmitted to the utilising apparatus 4, which then takes appropriate action in the event of recognition of the speech.

Typically, the recognition processor needs to acquire data concerning the speech against which to verify the speech signal, and this data acquisition may be performed by the recognition processor in a second mode of operation in which the recognition processor 3 is not connected to the utilising apparatus 4, but receives a speech signal from the microphone 1 to form the recognition data for that word or phrase. However, other methods of acquiring the speech recognition data are also possible.

Typically, the recognition processor 3 is ignorant of the route taken by the signal from the microphone 1 to and through the network 2; any one of a large variety of types and qualities of receiver handset. Likewise, within the network 2, any one of a large variety of transmission paths may be taken, including radio links, analog and digital paths and so on. Accordingly, the speech signal Y reaching the recognition processor 3 corresponds to the speech signal S received at the microphone 1, convolved with the transfer characteristics of the microphone 1, link to network 2, channel through the network 2, and link to the recognition processor 3, which may be lumped and designated by a single transfer characteristic H.

Figure 2:
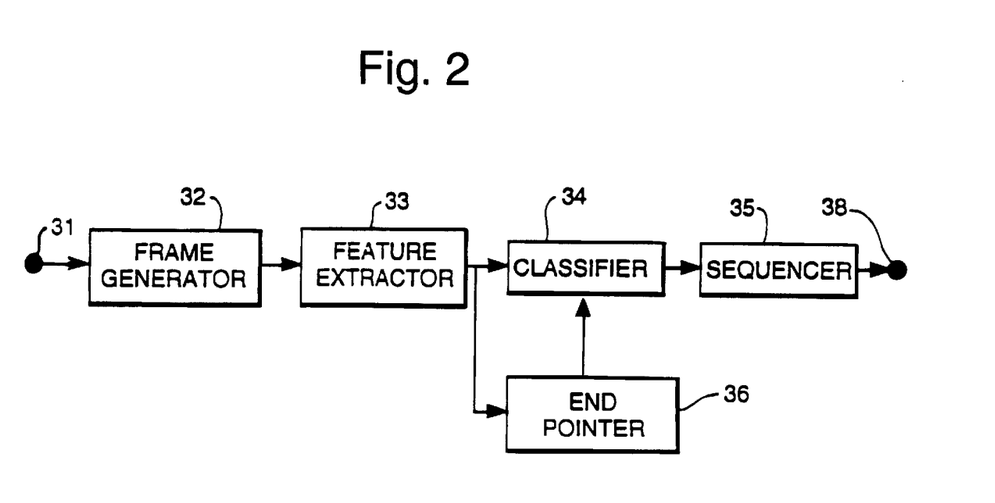
FIG. 2 is a block diagram showing schematically the functional elements of a recognition processor according to the invention.

Referring to FIG. 2, the recognition processor 3 comprises an input 31 for receiving speech in digital form (either from a digital network or from an analog to digital converter), a frame processor 32 for partioning the succession of digital samples into a succession of frames of contiguous samples; a feature extractor 33 for generating from a frame of samples a corresponding feature vector; a classifier 34 receiving the succession of feature vectors and operating on each with a plurality of model states, to generate recognition results; a sequencer 35 which is arranged to receive the classification results from the classifier 34 and to determine the predetermined utterance to which the sequence of classifier output indicates the greatest similarity; and an output port 38 at which a recognition signal is supplied indicating the speech utterance which has been recognised.

Frame Generator 32

The frame generator 32 is arranged to receive speech samples at a rate of, for example, 8,000 samples per second, and to form frames comprising 256 contiguous samples, at a frame rate of 1 frame every 16 ms. Preferably, each frame is windowed (i.e. the samples towards the edge of the frame are multiplied by predetermined weighting constants) using, for example, a Hamming window to reduce spurious artifacts, generated by the frames edges. In a preferred embodiment, the frames are overlapping (for example by 50%) so as to ameliorate the effects of the windowing.

Feature Extractor 33

The feature extractor 33 receives frames from the frame generator 32 and generates, in each case, a set or vector of features. The features may, for example, comprise cepstral coefficients (for example, LPC cepstral coefficients or mel frequency cepstral coefficients as described in "On the Evaluation of Speech Recognisers and Databases using a Reference System", Chollet & Gagnoulet, 1982 proc. IEEE p2026), or differential values of such coefficients comprising, for each coefficient, the differences between the coefficient and the corresponding coefficient value in the preceding vector, as described in "On the use of Instantaneous and Transitional Spectral Information in Speaker Recognition", Soong & Rosenberg, 1988 IEEE Trans. on Acoustics, Speech and Signal Processing Vol 36 No. 6 p871. Equally, a mixture of several types of feature coefficients may be used.

The feature extractor 33 outputs a frame number, incremented for each successive frame. The output of the feature extractor 33 is also passed to an end pointer 36, the output of which is connected to the classifier 34. The end pointer 36 detects the end of speech and various types are well known in this field.

The frame generator 32 and feature extractor 33 are, in this embodiment, provided by a single suitably programmed digital signal processor (DSP) device (such as the Motorola DSP 56000, or the Texas Instruments TMS C 320) or similar device.

Classifier 34

Figure 3:
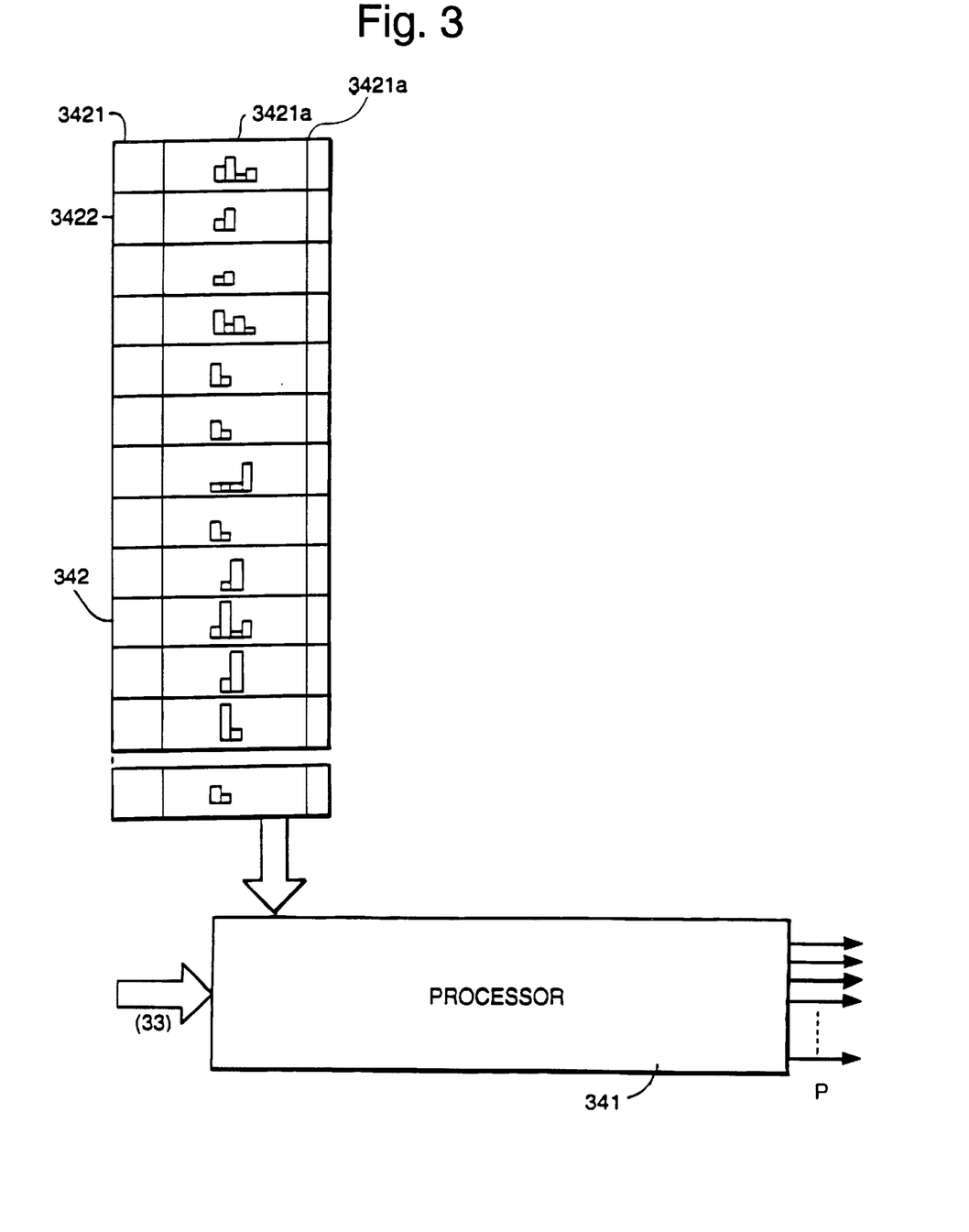
FIG. 3 is a block diagram indicating schematically the components of a classifier forming part of FIG. 2.

Referring to FIG. 3, in this embodiment, the classifier 34 comprises a classifying processor 341 and a state memory 342.

The state memory 342 comprises a state field 3421, 3422, . . . , for each of the plurality of speech states. For example, each allophone to be recognised by the recognition processor comprises 3 states, and accordingly 3 state fields are provided in the state memory 342 for each allophone.

The classification processor 34 is arranged to read each state field within the memory 342 in turn, and calculate for each, using the current input feature coefficient set, the probability that the input feature set or vector corresponds to the corresponding state.

Accordingly, the output of the classification processor is a plurality of state probabilities P, one for each state in the state memory 342, indicating the likelihood that the input feature vector corresponds to each state.

The classifying processor 341 may be a suitably programmed digital signal processing (DSP) device, may in particular be the same digital signal processing device as the feature extractor 33.

Sequencer 35

Figure 4:
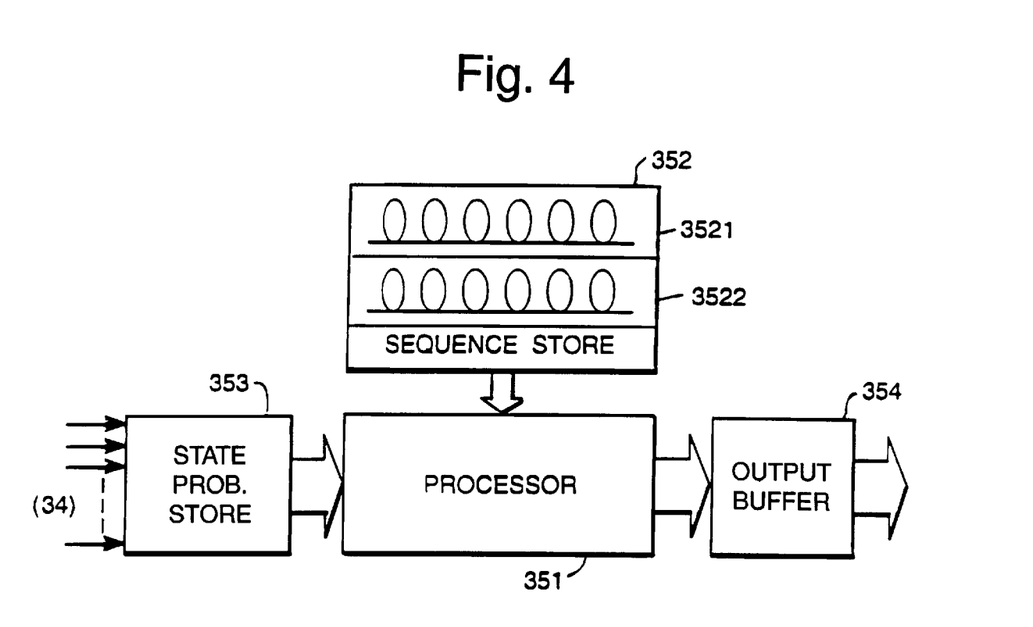
FIG. 4 is block diagram showing schematically the structure of a sequence parser forming part of the embodiment of FIG. 2.

Referring to FIG. 4, the sequencer 35 in this embodiment comprises a state sequence memory 352, a parsing processor 351, and a sequencer output buffer 354.

Figure 5:
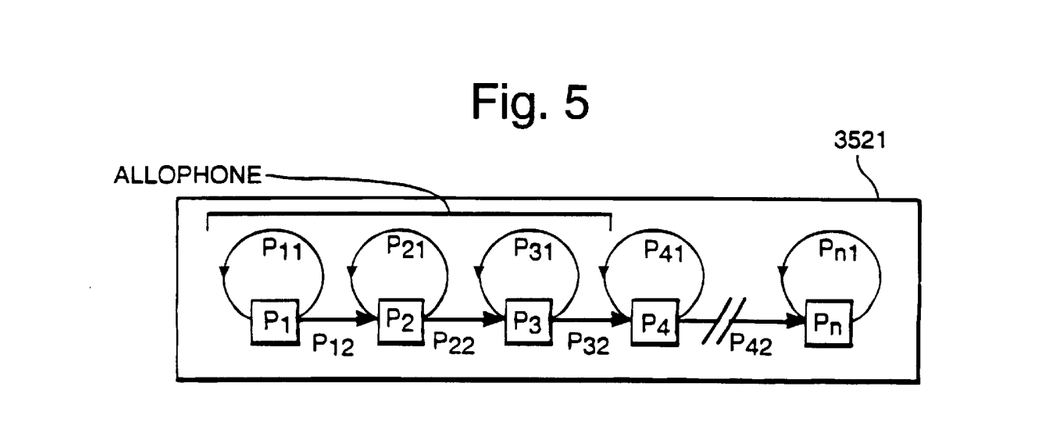
FIG. 5 shows schematically the content of a field within a store forming part of FIG. 5.

Also provided is a state probability memory 353 which stores, for each frame processed, the state probabilities output by the classifier processor 341. The state sequence memory 352 comprises a plurality of state sequence fields 3521, 3522, . . . , each corresponding to a word or phase sequence to be recognised consisting of a string of allophones.

Each state sequence in the state sequence memory 352 comprises, as illustrated in FIG. 5, a number of states $P_1$, $P_2$, . . . $P_N$ (where N is a multiple of 3) and, for each state, two probabilities; a repeat probability ($P_{i1}$) and a transition probability to the following state ($P_{i2}$) The states of the sequence are a plurality of groups of three states each relating to a single allophone. The observed sequence of states associated with a series of frames may therefore comprise several repetitions of each state $P_i$ in each state sequence model 3521 etc; for example:

| Frame Number | 1 | 2 | 3 | 4 | 5 | 6 | 7 | 8 | 9 | ... | Z | Z+1 |
|---|---|---|---|---|---|---|---|---|---|---|---|---|
| State | P1 | P1 | P1 | P2 | P2 | P2 | P2 | P2 | P2 | ... | Pn | Pn |

The parsing processor 351 is arranged to read, at each frame, the state probabilities output by the classifier processor 341, and the previous stored state probabilities in the state probability memory 353, and to calculate the most likely path of states to date over time, and to compare this with each of the state sequences stored in the state sequence memory 352.

The calculation employs the well known HMM, as discussed in the above referenced Cox paper. Conveniently, the HMM processing performed by the parsing processor 351 uses the well . known Viterbi algorithm. The parsing processor 351 may, for example, be a microprocessor such as the Intel(™) i-486(™) microprocessor or the Motorola(™) 68000 microprocessor, or may alternatively be a DSP device (for example, the same DSP device as is employed for any of the preceding processors).

Accordingly for each state sequence (corresponding to a word, phrase or other speech sequence to be recognised) a probability score is output by the parser processor 351 at each frame of input speech. For example the state sequences may comprise the names in a telephone directory. When the end of the utterance is detected, a label signal a indicating the most probable state sequence is output from the parsing processor 351 to the output port 38, to indicate that the corresponding name, word or phrase has been recognised.

The parsing processor 351 comprises a network which is specifically configured to recognise certain phrases or words for example a string of digits.

Figure 6:
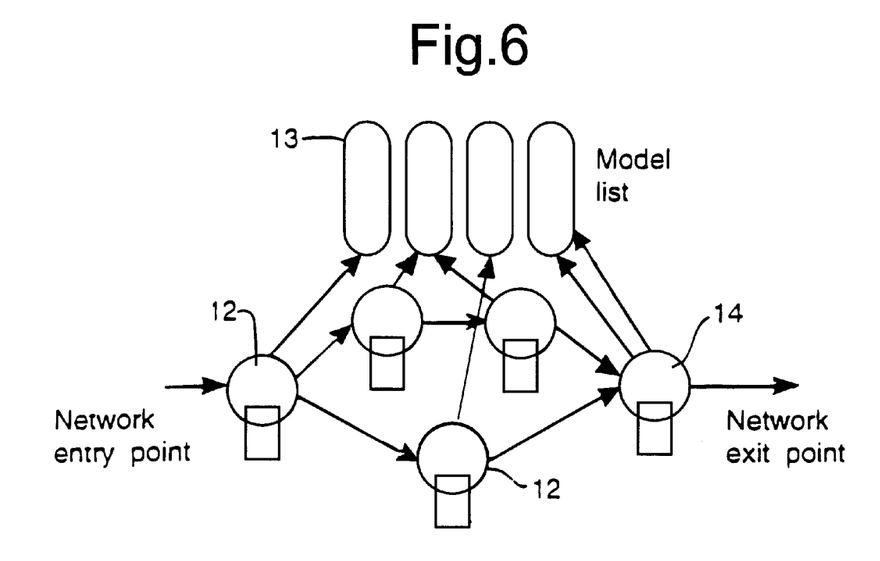
FIG. 6 is a schematic representation of one embodiment of a recognition network applicable with the processor of the sequence parser of FIG. 4.
Figure 7A:
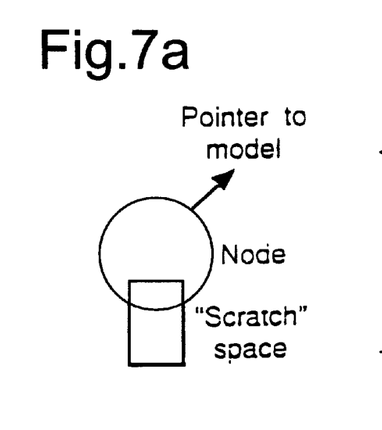
FIG. 7a shows a node of a network and FIG. 7b shows a path link as employed according to the invention.

FIG. 6 shows a simple network for recognising a string of words, in this case either a string of four words or a string of three. Each node 12 of the network is associated with a word representation model 13, for example a HMM, which is stored in a model list. Several nodes can be associated with each model and each node includes a pointer to its associated model (as can be seen in FIGS. 6 and 7*a*). In order to produce a best match and a single alternative parse, the final node 14 is associated with two models so allowing this node to process two paths. If n parses are required, the final node 14 of the network is associated with n identical word models.

Figure 7B:
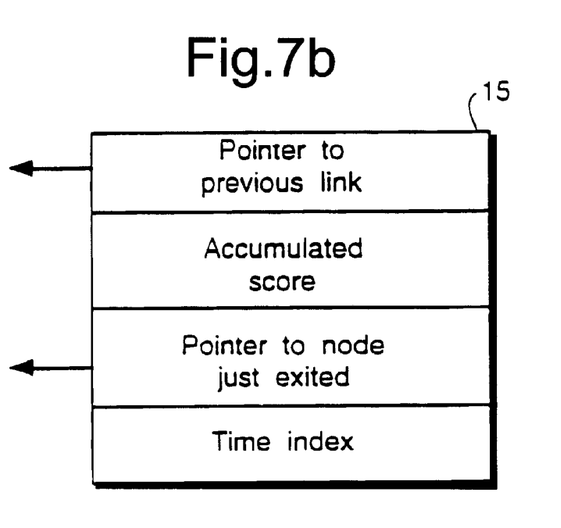
Figure 8:
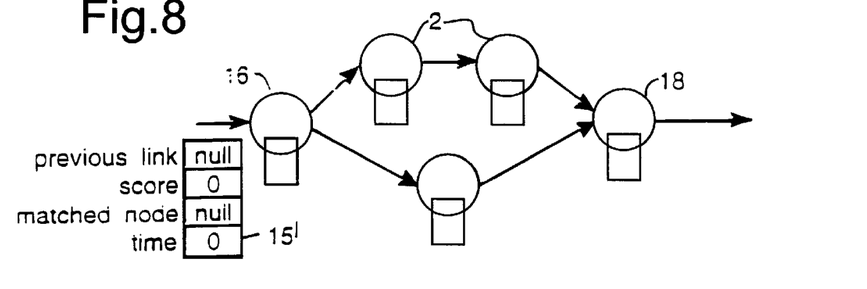
FIG. 8 to 10 show the progression of path links through the network of FIG. 6.

As shown in FIG. 7*b*, a path link 15 contains information relating to a pointer to the previous path link, an accumulated score, a pointer to the node previously exited and a time index. At the start of an utterance, an empty path link 15' is inserted into the first node 16 as shown in FIG. 8. The first node now contains a path link and is therefore active whereas the remaining nodes are inactive. At each clock tick (i.e. with each incoming frame of speech) any active nodes accumulate a score in their path link.

Figure 9:
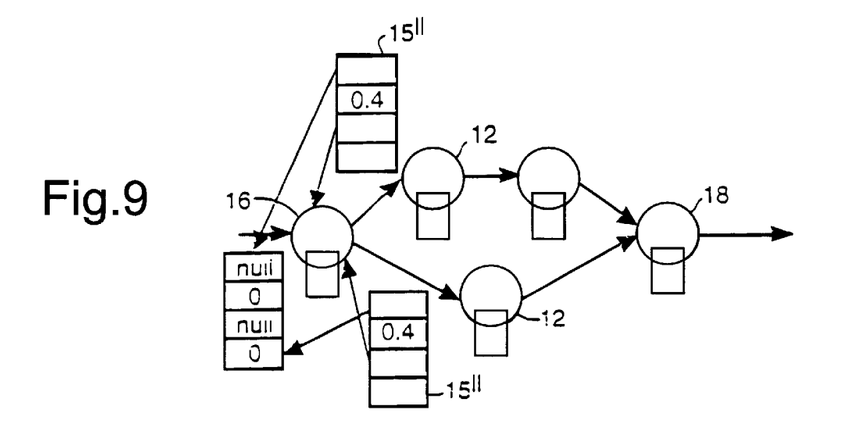

If the first model can match, say, a minimum of seven frames of speech, then at the seventh clock pulse a path link 15" is output from the first node with the score for matching the seven frames to the model and pointers to the entry path link and the node just matched. The path link is fed to all of the following nodes 12, as shown in FIG. 9. Now the first three nodes are active. The input frame of speech is then matched in the models associated with the active nodes and new path links outputted.

This processing continues, with the first node 16 producing further path links as its model matches increasingly longer parts of the utterance and the succeeding nodes performing similar calculations.

Figure 10:
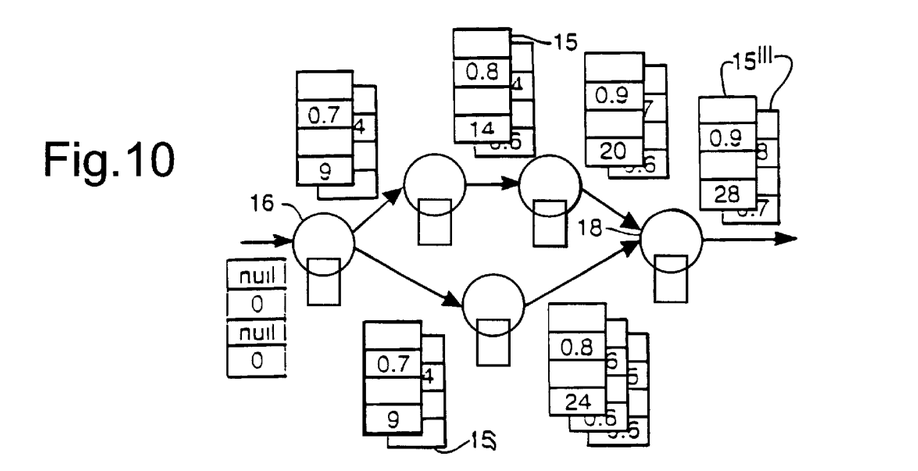

When the input speech has been processed as far as the final node 18 of the network, path links from each 'branch' of the network may be presented to this node 18. If, at any given time frame, there is a single path link (i.e. only one of the parallel paths has been completed) that path link is taken to be the best (and only) match and is processed by the final node 18. However, if there are two path links presented to the final node 18, both are processed by that node, since the final node 18 is able to process more than one path. The output path links are continuously updated at each frame of speech. When the utterance is completed there will be two path links 15''' at the output of the network, as shown in FIG. 10 (from which the pointers to previous path links and nodes have been excluded for the sake of clarity).

The full path can be found by following the pointers to the previous path links and the nodes on the recognised path (and hence the input speech deemed to be recognised) can be identified by looking at the pointers to the nodes exited.

Figure 11:
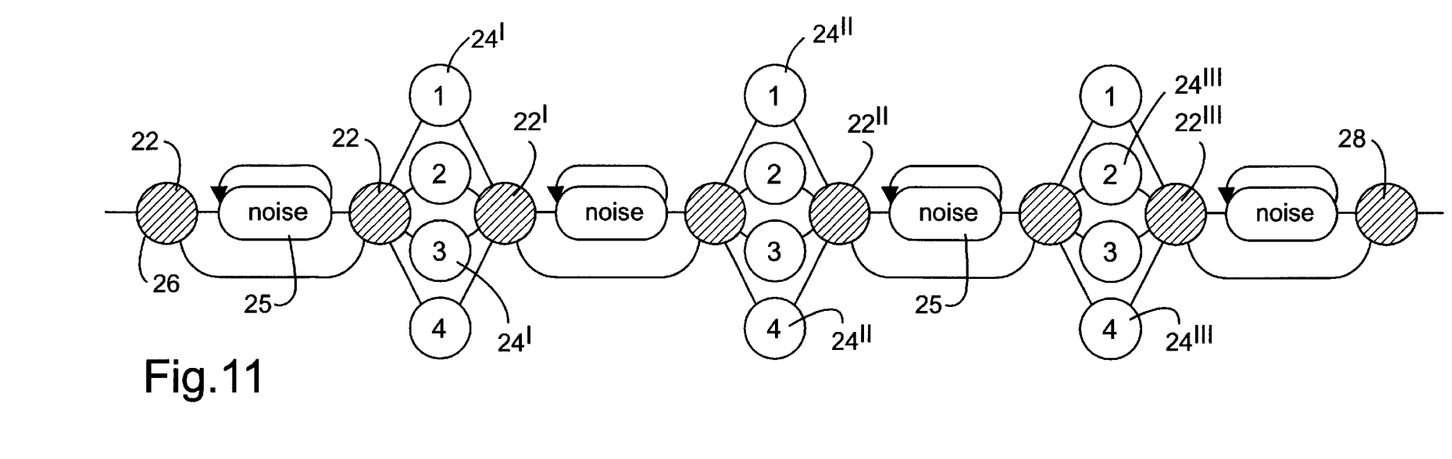
FIG. 11 is a schematic representation of a second embodiment of a network of a system according to the invention.

FIG. 11 represents a second embodiment of a network configured to recognise strings of three digits. The grey nodes 22 are null nodes in the network; the white nodes are active nodes which may be divided into vocabulary nodes 24 with associated word representation models (not shown), for matching incoming speech and noise nodes 25 which represent arbitrary noise.

If all of the active nodes 24, 25 after and including the third null node 22' are each capable of processing three paths (i.e. each vocabulary node 24 is associated with three word representation models), the output of the network will comprise path links relating to the three top scoring paths of the system. As described with reference to FIGS. 8 to 10, the three paths can be found by following, for each path, the pointers to the previous path links. The nodes on the paths (and hence the input speech deemed to be recognised) can be identified by looking at the pointers to the exited nodes.

In a further development of the invention, the path links may be augmented with signatures which represent the significant nodes of the network. These significant nodes may, for example, include all vocabulary nodes 24. In the embodiment of FIG. 11, each vocabulary node 24 is assigned a signature, for example the nodes representing the digit 1 are assigned a signature '1', the nodes 24" representing the digit 2 are assigned a signature '2' and so on.

At the start of parsing, a single empty path link is passed into a network entry node 26. Since this is a null node, the path link is passed to the next node, a noise node 25. The input frame is matched in the noise model (not shown) of this node and an updated path link produced at the output. This path link is then passed to the next active nodes i.e. the first vocabulary nodes 24 having an associated model (not shown). Each vocabulary node 24 processes the frame of speech in its associated word model and produces an updated path link. The signature field of the path link is also updated. At the end of each time frame, the updated path links are sorted to retain the three (n) top scoring paths which have different signature fields. A list ordered by score is maintained with the added constraint that accumulated signatures are unique: if a second path link with the same signature enters, the better of the two is retained. The list contains only the top "n" different paths, the rest being ignored.

The n path links are propagated through the next null node 22' to the following noise node 25 and vocabulary nodes 24", each of which are associated with three identical word representation models. After this, model processing takes place, resulting in the updating of the lists of path links and the extending of the paths into further nodes 24''', 25. It should be clear that the signature fields of the path links are not updated after processing by the null nodes 22 or the noise nodes 25 since these nodes do not have assigned signatures.

The path links are propagated along paths which pass through the remaining active nodes to produce, at an output node 28, up to three paths links indicating the relative scores and signatures, for example 1 2 1, of the paths taken through the network. The path links are continuously updated until the end of speech is detected (for example by an external device such as a pause detector or, until a time out is reached). At this point, the pointers or the accumulated signatures of the path links at the output node 28 are examined to determine the recognition results.

For example, presuming that the following three path links are presented to the output node 28 at some time instant:

|   | SCORE | SIGNATURE |
|---|---|---|
| A | 10 | 1 2 2 |
| B | 9  | 1 2 2 |
| C | 7  | 1 3 2 |

Path A, the highest scoring path, is the best match. However, although path B has the second best score, it would be rejected as an alternative parse since its signature, and hence the speech deemed to be recognised, is the same as path A. Path C would therefore be retained as the second best parse.

Figure 12:
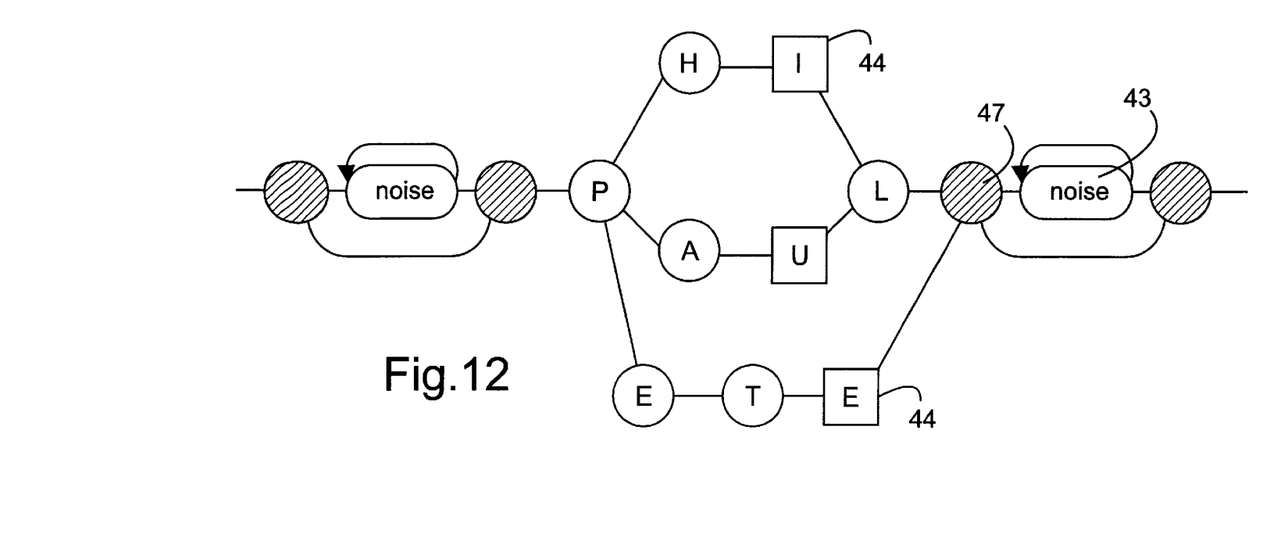
FIG. 12 is a schematic representation of a third embodiment of a network of a system according to the invention.

If the strings to be recognised have more structure than that discussed above, for example spelt names, signatures need only be assigned to nodes just before decision points, rather than at every vocabulary node. FIG. 12 shows a network for recognising the spelling of the names "Phil", "Paul" and "Peter". For simplicity, no noise is illustrated. The square nodes 44 indicate where the signature should be augmented.

The system can distinguish between the 'PHI' and 'PAU' paths at the 'L' node because the signatures of the path links created at the previous nodes are different. The following node 47 will be able to distinguish between all three independent paths since the signatures of the square nodes 44 are different. Only the 'L' node and the final noise node 48 need to be associated with more than one identical word model, so that these models are capable of processing more than one path.

In all cases, each network illustrating the speech to be recognised requires analysis to determine which nodes are to be assigned signatures. In addition the network is configured to be compatible with what a user is likely to say.

Savings in memory size and processing speed may be achieved by limiting the signatures that a node will propagate, as described in the applicants' International patent application filed on Mar. 31, 1994 entitled "Connected Speech Recognition", claiming priority from European application No. corresponding to co-pending U.S. patent application Ser. No. 08/530,170 filed Oct. 11, 1995 naming Smyth et al as inventors incorporated herein by this reference. For instance, say the only valid input speech to a recogniser having the network of FIG. 6 is the four following numbers only: 111, 112, 121, 211. Certain nodes within the network are associated with a set of valid signatures and a path will only be propagated by such a 'constrained' node if a path link having one of these signatures is presented. To achieve this, the signature fields of the path links entering a constrained node, eg third null node 22', are examined. If the signature field contains a signature other than 1 or 2, the path link is discarded and the path is not propagated any further. If an allowable path link is presented, it is passed on to the next node. The next constrained node is the null node 22" after the next vocabulary nodes. This null node is constrained to only propagate path links having a signature 11, 12 or 21. The null node 22''' after the next vocabulary nodes is constrained to only propagate path links having the signature 111, 112, 121 or 211. Such an arrangement significantly reduces the necessary processing and allows for a saving in the memory capacity of the apparatus. Only some of the nodes at decision points in the network need to be so constrained. In practice, a 32 bit signature has proved to be suitable for sequences of up to 9 digits. A 64 bit signature appears suitable for a 12 character alphanumeric string.

End of speech detection and various other aspects of speech recognition relevant to the present invention are more fully set out in the applicants' International Patent Application filed on Mar. 25, 1994 entitled "Speech Recognition", claimimg priority from European patent application No. corresponding to copending U.S. patent application Ser. No. 08/525,730 filed Dec. 19, 1995 naming Power et al as inventors which is herein incorporated by this reference.

In the above described embodiments, recognition processing apparatus suitable to be coupled to a telecommunications exchange has been described. However, in another embodiment, the invention may be embodied on simple apparatus connected to a conventional subscriber station (mobile or fixed) connected to the telephone network; in this case, analog to digital conversion means may be provided for digitising the incoming analog telephone signal.

What is claimed is:

1. A speech recognition system comprising:

means for deriving a recognition feature vector from an input speech signal for each of predetermined time frames;

means for modelling predetermined possible input speech comprising a plurality of vocabulary nodes each of which has an associated word representation model and links between said vocabulary nodes;

processing means for comparing the recognition feature vectors with the modelled input speech and for generating a path link for each node and time frame, said path links indicating the most likely prior sequence of vocabulary nodes for each vocabulary node and time frame, each path link comprising a field for storing an accumulated recognition score and a field for storing a reference to the most likely previous path link in the sequence; and means for indicating recognition of the input speech signal in dependence upon the comparison;

the processing means being capable of processing more than one path link for at least one vocabulary node, other than the final node, in a single time frame.

2. A speech recognition system as in claim 1 wherein at least one of the vocabulary nodes is associated with more than one identical word representation model.

3. A speech recognition system as in claim 2 wherein the word representation models are Hidden Makov Models.

4. A speech recognition system as in claim 1 wherein all the vocabulary nodes have signatures assigned to them.

5. A speech recognition system as in claim 1 wherein only the vocabulary nodes occurring before a decision point have signatures assigned to them.

6. A speech recognition system as in claim 4 wherein the path links include an accumulated signature.

7. A speech recognition system as in claim 4 wherein at least some of the nodes are constrained only to propagate path links having certain predetermined signatures.

8. A speech recognition system as in claim 4 wherein the recognition indicating means includes means for comparing the said recognition score and signature of the path links to determine the path with the best match to the input connected speech and those with the next best alternative matches.

9. A method of speech recognition comprising:

deriving a recognition feature vector from an input speech signal for each of predetermined time frames, modelling predetermined possible input speech;

comparing the feature data with the modelled input speech by generating a network containing a plurality of vocabulary nodes associated with word representation models and generating a path link for each node and time frame, the path link indicating the most likely prior sequence of vocabulary nodes for each vocabulary node and time frame, each path link comprising a field for storing an accumulated recognition score and a field for storing a reference to the most likely previous path link in the sequence; and indicating recognition of the speech independence upon the comparison wherein more than one path link is processed in a single time frame for at least one vocabulary node other than the final node.

10. A method as in claim 9 wherein the at least one of the vocabulary nodes is associated with more than one identical word representation model.

11. A method as in claim 10 wherein at least one of the vocabulary nodes is associated with a number of identical word representation models equal to the number of desired recognition results.

12. A method as in claim 10 wherein the said recognition scores of the path links are compared at each decision point of the network, only the n top scoring path links being propagated to the next nodes(s).

13. A method as in claim 10 wherein signatures are assigned to all the vocabulary nodes.

14. A method as in claim 10 wherein signatures are only assigned to vocabulary nodes occurring before a decision point in the network.

15. A method as in claim 12 wherein signatures are assigned to all the vocabulary nodes and the signatures of the path links are also compared, only path links having different signatures being propagated to the next node(s).

16. A method as in claim 13 wherein at least some nodes are constrained only to pass path links having certain predetermined signatures in their signature fields.

17. A method as in claim 9 wherein the input speech signal deemed to be recognised is determined by tracing the path links back through the network.

18. A method as in claim 13 wherein the input speech signal deemed to be recognised is determined by the accumulated signature of each path link.

19. A method as in claim 10 wherein the best scoring path link is processed by the first word representation model of a vocabulary node, the next best by the second and so on until either parallel models or incoming path links run out.

* * * * *